United States Patent
Kishi et al.

(10) Patent No.: US 6,465,610 B1
(45) Date of Patent: Oct. 15, 2002

(54) METHOD AND APPARATUS FOR MANUFACTURING PLASTIC OPTICAL ELEMENT AND PLASTIC OPTICAL ELEMENT

(75) Inventors: Hidenobu Kishi; Yasuo Yamanaka; Jun Watanabe; Kiyotaka Sawada, all of Kanagawa-ken; Toshiharu Hatakeyama, Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/586,773

(22) Filed: Jun. 5, 2000

(30) Foreign Application Priority Data

Jun. 3, 1999 (JP) .......................... 11-156305
Dec. 6, 1999 (JP) .......................... 11-345992

(51) Int. Cl.⁷ ................................. C08J 3/00
(52) U.S. Cl. ..................... 528/503; 523/106
(58) Field of Search ............... 524/1; 523/106; 528/503

(56) References Cited

U.S. PATENT DOCUMENTS

| | | | | |
|---|---|---|---|---|
| 5,108,689 A | * | 4/1992 | Uehara | 264/328.7 |
| 5,288,450 A | * | 2/1994 | Koizumi | 264/235 |
| 5,603,871 A | * | 2/1997 | Koseko | 264/1.9 |
| 6,110,406 A | * | 8/2000 | Ishibashi | 264/143 |

* cited by examiner

*Primary Examiner*—Paul R. Michl
(74) *Attorney, Agent, or Firm*—Oblon, Spivak, McClelland, Maier & Neustadt, P.C.

(57) ABSTRACT

A method for manufacturing an optical element, such as a plastic lens or similar, by molding. The manufacturing method includes the steps of molding the plastic lens under a prescribed molding temperature higher than a glass transition level of the plastic material used to from the optical element. The manufacturing method also includes the step of gradually cooling the optical element by at least 5° C. with a speed which decreases by approximately 3° C. per minute. The optical element formed from a plastic material includes a substantially rectangular shape having a width, a height, and a thickness, wherein the width is greater than the height and the thickness is measured in an optical axis direction. The optical element also includes a refractive index distribution of approximately $2\times10^{-5}$ at a central half section of the height. The optical element may be defined by the manufacturing method having the molding step and the gradual cooling step. The apparatus used to manufacture the optical element includes a molding device for molding the optical element under a prescribed molding temperature higher than a glass transition level of the plastic material forming the optical element and a device for gradually cooling the optical element.

10 Claims, 10 Drawing Sheets

| $\Delta n_{1/2}$ | Cooling Speed | |
|---|---|---|
| | 6 Min | 15 Min |
| Tg−5 °C | 17.0 | 17.1 |
| Tg−10 °C | 14.6 | 14.5 |

(Unit: $\times 10^{-5}$)

Mold Temperature

FIG. 4A

| $\Delta n_{1/2}$ | Cooling Speed | | |
|---|---|---|---|
| | 5 °C /Min | 3 °C /Min | 1 °C /Min |
| Tg−10 °C | 13.5 | 10.9 | 8.2 |
| Tg−20 °C | 10.2 | 4.6 | 2.4 |
| Tg−30 °C | 6.9 | 2.6 | 1.2 |
| Tg−40 °C | 6.0 | 2.2 | 0.7 |

(Unit: $\times 10^{-5}$)

Mold Separation Temperature

FIG. 7A

| $\Delta n_{1/2}$ | | Cooling Speed | | |
|---|---|---|---|---|
| | | 5°C /Min | 3°C /Min | 1°C /Min |
| | Tg–20°C | 3.9 | 3.2 | 2.3 |
| | Tg–25°C | 3.6 | 2.5 | 1.3 |
| | Tg–30°C | 3.4 | 1.9 | 0.9 |
| | Tg–40°C | 3.3 | 1.6 | 0.6 |

Taking out Temperature (Unit: $\times 10^{-5}$)

FIG. 7B

| $\Delta n_{1/2}$ | | Annealing Time Period | | |
|---|---|---|---|---|
| | | 1 hour | 3 hour | 6 hour |
| | Tg–5°C | 4.1 | 4.0 | 4.0 |
| | Tg–10°C | 4.4 | 3.8 | 3.9 |

Annealing Temperature (Unit: $\times 10^{-5}$)

METHOD AND APPARATUS FOR MANUFACTURING PLASTIC OPTICAL ELEMENT AND PLASTIC OPTICAL ELEMENT

The present application claims priority under 35 U.S.C. § 119 to Japanese Patent Application Nos. 11-156305, filed on Jun. 03, 1999, and 11-345992, filed on Dec. 06, 1999, the entire contents of which are hereby incorporated by reference.

BACKGROUND OF THE INVENTION

1. Field of the Invention

The present invention relates in general to a plastic optical element and a method and an apparatus for manufacturing the plastic optical element.

2. Discussion of the Background

In recent years, plastic-made optical elements are increasingly utilized because of the optical element's mass producability, lightness, and degree of freedom of shape or similar. Such increased usage of optical plastics is because of the optical plastics' characteristics of low sponginess and low double refractivity. A molding method for the optical plastics, such as an injection compression molding method, satisfies both the shape precision and low double refraction characteristic.

Besides the shape precision and the low double refraction characteristic, it is currently required that the distribution of a refractive index in an optical element be small, while also requiring a more highly precise plastic optical element. The refractive index generally varies the larger the optical element is and the closer the optical element is to a surface of a molding item (i.e., lens), in contrast to the smaller the optical element is and the closer it is to a center of the molding item. Such a distribution can generally be a cause of deviation of the focusing position in a focusing lens.

For example, as a light scanning lens, Japanese Patent Application Laid Open No. 10-288749 (hereinafter JP '749) describes the refractive index varying in such a manner that a light spot, which is to condense on a scanning operation receiving surface, tends to distance itself from a light deflection instrument and passes through a predetermined designed position. As a result, a diameter of the light spot on the scanning operation receiving surface becomes larger than the designed value, and accordingly, image quality of a recording image written by such a light scanning operation is lowered.

Further, it is currently believed that the distribution of the refractive index is produced by the following. Namely, a molding item is cooled too fast when its temperature is higher than a glass transition point or a heat deformation temperature in a plastic cooling and consolidating process of a molding operation, and accordingly, plastic density becomes uneven.

To avoid the influence of the refractive index distribution, the following technologies are heretofore proposed. For example, Japanese Patent Application No. 8-201717 (hereinafter JP '717) describes that a lens shape is defined by the inequality, as follows:

H/T>2, wherein T represents thickness in a beam advancing direction of the lens, and H represents height perpendicular to the beam advancing direction.

According to the technology, the refractive index distribution in a beam transmission region is decreased, because the height is increased, and accordingly, the temperature distribution in the beam transmission region during a plastic cooling process becomes relatively smaller.

Further, Japanese Patent Application No. 9-49976 (hereinafter JP '976) proposes a technology wherein a beam is focused on a scanning operation receiving surface by increasing the refraction force of a scanning operation receiving the surface side of the focusing lens so that the focusing positional deviation caused by the refractive index distribution of a focusing lens is corrected.

Further, Japanese Patent Application No. 9-109165 (hereinafter JP '165) proposes a technology wherein the refractive index distribution is decreased by applying the process, as follows:

Namely, an injection compression-molding item is subjected to an annealing process for more than two hours under a temperature ranging from −55° C. to −25° C. of a glass transition point of the optical plastic material as a reference.

JP '717 has the disadvantage that the cost of production is greatly increased, because both the amount of plastic to be used is increased and the cooling time period required is increased.

JP '976 has the disadvantage that a correcting value needs to be determined and evaluated, after a lens is molded and processed under fixed molding conditions. The correcting value may need to be changed and the shape should be corrected again, if the molding conditions are changed. Additionally, the correction should be made per cavity, whereby the development of a mold could be enormously costly, if a mold capable of producing a plurality of items at once is utilized. Further, all molded products become invalid, and accordingly, a yielding rate is lowered, even if the refractive index distribution varies only slightly because of the unstableness of the molding conditions.

JP '165 has the disadvantage that although it is possible to decrease the refraction index distribution up to a prescribed level, such a decreased refraction index distribution is insufficient for a highly precise lens. In addition, the time period for the annealing process may be long (i.e., up to a few hours) and become extremely expensive.

SUMMARY OF THE INVENTION

Accordingly, an object of the present invention is to address and resolve such problems and provide a new method for manufacturing an optical element made of plastic using a molding operation, which includes the steps of molding an optical element under a prescribed molding temperature higher than the glass transition level of the plastic, and gradually cooling the optical element by at least 5° C. with a descending speed of 3° C. per minute.

In another embodiment, the step of keeping a temperature of the optical element within a prescribed range for more than 3 minutes, before the gradual cooling of the optical element, is included.

In yet another embodiment, the steps of naturally cooling the optical element down to a temperature below a mold separation temperature, and heating the optical element up to a prescribed temperature before gradually cooling the optical element are included.

In yet another embodiment, the gradual cooling of the optical element is performed after the optical element is separated from the mold.

In yet another embodiment, the gradual cooling of the optical element is performed beginning at a temperature lower than the glass transition point by 40° C. to that by 10° C.

In yet another embodiment, the gradual cooling of the optical element is performed before the optical element is separated from the mold.

In yet another embodiment, the gradual cooling of the optical element is performed by air-cooling the mold or by controlling the temperature of the mold using a temperature control apparatus after separating the mold from a molding machine.

In yet another embodiment, the gradual cooling of the optical element is performed by providing and controlling any one of a heater, a cooling element, and a temperature control tube in the mold.

In yet another embodiment, the temperature control is performed by inserting the optical element into a temperature control apparatus and controlling the temperature control apparatus.

In yet another embodiment, the gradual cooling of the optical element is performed by transferring either the mold, whose cavity is filled with the plastic, or the optical element itself, through a temperature control apparatus, in which a room temperature varies along with the transportation.

In yet another embodiment, the optical element is substantially rectangularly shaped so as to have a longer width, a shorter height, and a prescribed thickness in an optic axis direction and the refractive index distribution is approximately $2 \times 10^{-5}$ at a central 50% section of the thickness of the optical element.

In yet another embodiment, the optical plastic element is made of thermoplastic and non-crystal material.

BRIEF DESCRIPTION OF THE DRAWINGS

A more complete appreciation of the present invention and many of the attendant advantages thereof will be readily obtained as the same becomes better understood by the following detailed description when considered in connection with the accompanying drawings, wherein:

FIG. 4A is the first example of a table listing a result of measuring the refractive index distribution according to the present invention;

FIG. 4B is a table showing an example to be compared;

FIG. 7A is the second example of a table listing a result of measuring the refractive index distribution according to the present invention;

FIG. 7B is a table listing an example to be compared;

DETAILED DESCRIPTION OF THE PREFERRED EMBODIMENTS

Figure 1:
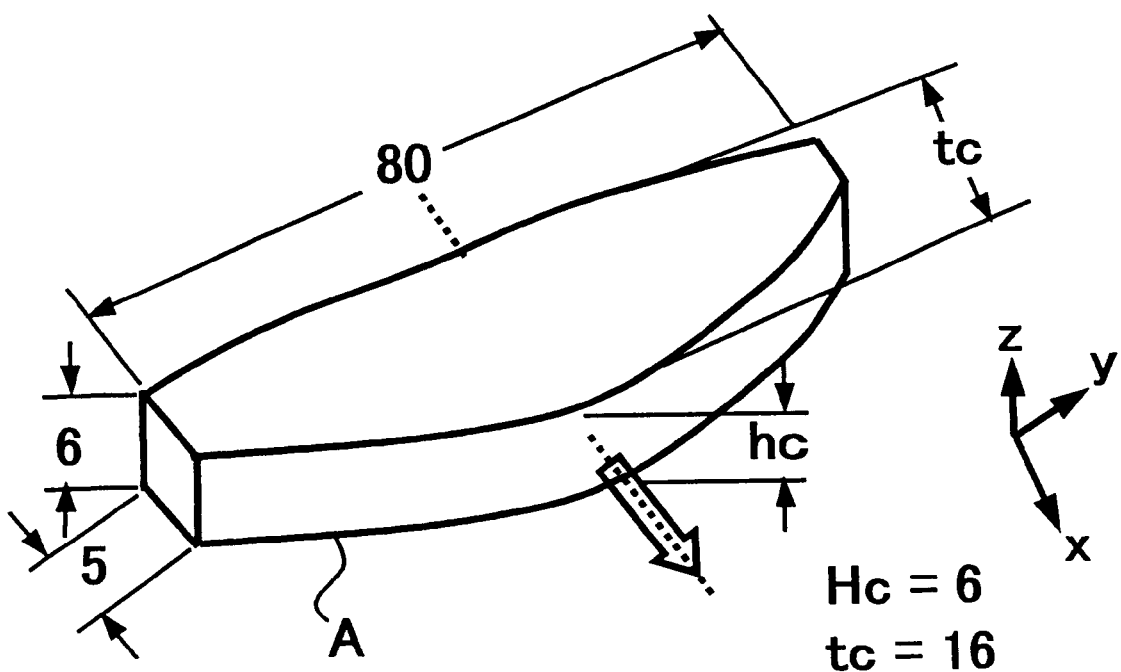
FIG. 1 is a schematic perspective view illustrating an optical scanning lens with size information.

Referring now to the drawings, wherein like reference numerals designate identical or corresponding parts throughout the several figures.

FIG. 1 illustrates an optical scanning lens and shows the preferred dimensions therefor. The optical scanning lens may be made of an elastomeric material, such as any one of thermoplastic non-crystal characteristic plastic and circular polyolefin. The optical scanning lens may have a height of 6 mm at its center, a thickness of 16 mm at its center, 5 mm at its edge portion, and a length of 80 mm. Further, it has been confirmed that an optical scanning lens having a height of 10 mm at its center can achieve similar advantages when used in the following embodiments.

The present applicants' method for measuring the refractive index, as disclosed in Japanese Patent Application Laid Open No. 8-122210, is utilized so that a measurement can be performed without crushing the lens. A refractive index distribution along with a subscanning direction of a beam (i.e., the Z-direction) at a center of the lens (i.e., a image height zero position) is obtained by accumulating and averaging the refractive index along with the light ray direction (i.e., the X-direction).

Figure 2:
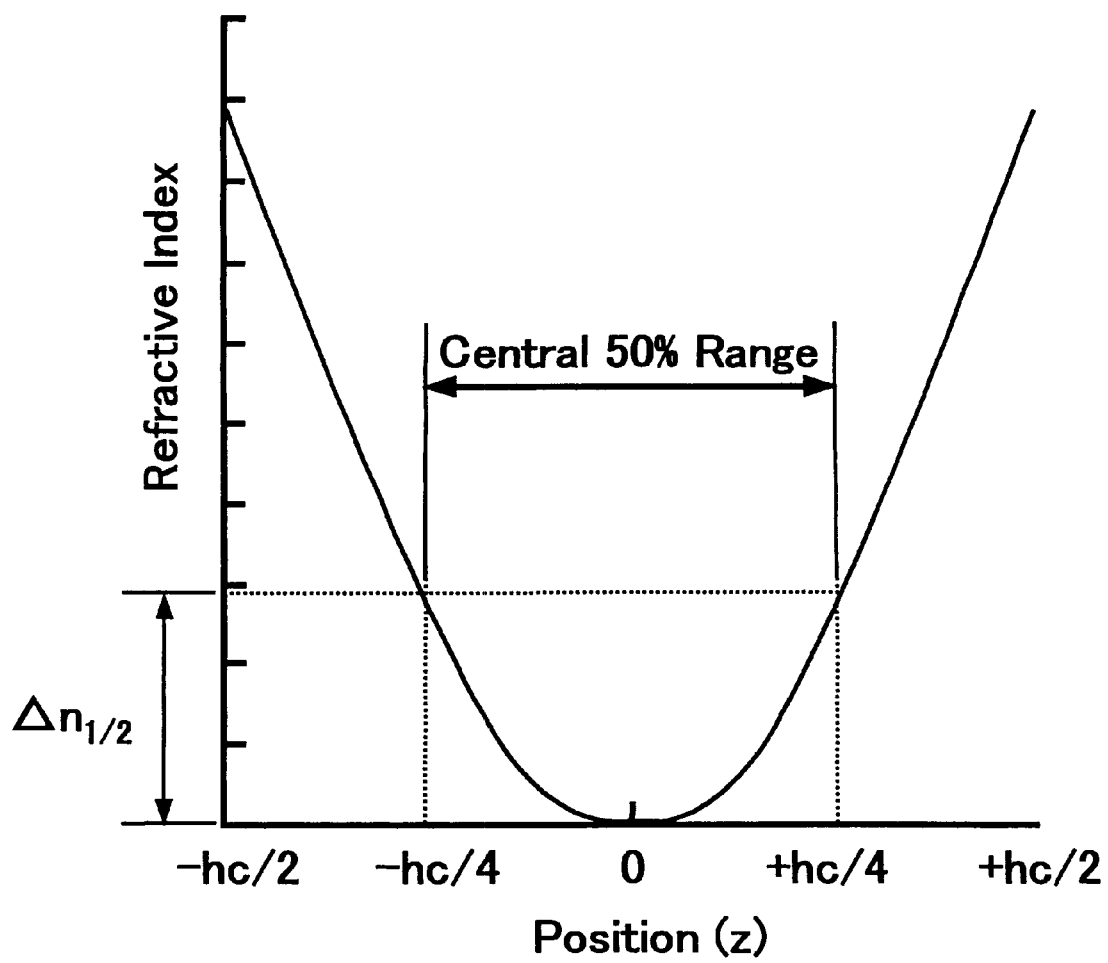
FIG. 2 is a characteristic-representing graph illustrating a distribution of the refractive index of the optical scanning lens.

Further, a difference between a maximum value and a minimum value of the refractive index within the central 50% range of the refractive index distribution is represented as $\Delta n_{1/2}$, as illustrated in FIG. 2, and evaluated as mentioned later.

Figure 3:
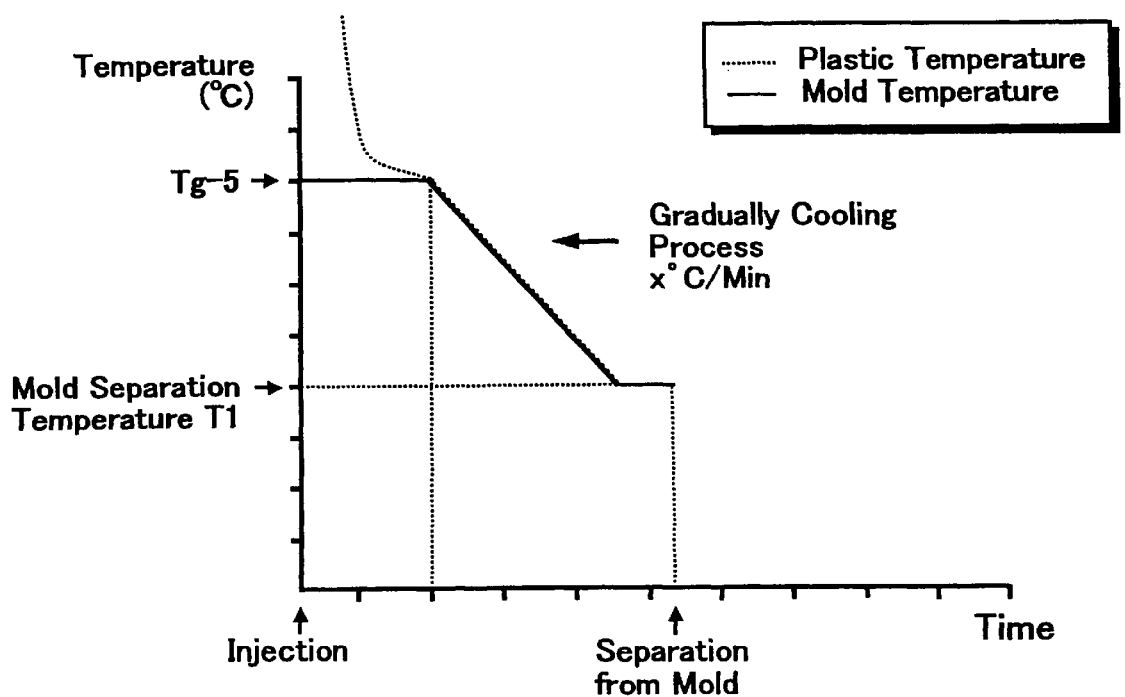
FIG. 3 is a characteristic-representing graph illustrating the gradual cooling process applied to the molding item.

The first embodiment is now described referring to FIGS. 3, 4A, and 4B. A plastic optical element (i.e., lens) may be molded using an injection compression molding method, and may receive a temperature control including a gradual cooling process in its molding process. A mold having a heater for controlling a temperature may be utilized in the vicinity of a cavity. A glass transition point (Tg) of 5° C. may be set as a temperature of the mold, when an injection molding operation is performed. After injection molding and keeping the mold temperature constant for four minutes, the mold may be gradually cooled down to mold separation temperature (T1) at a speed of X° C. per minutes. After that, the mold is held for 30 seconds to keep the mold separation temperature as illustrated in FIG. 3, and a molded product may be taken out therefrom. The above-mentioned heater can be a cooling element or a temperature control tube disposed in the mold.

To evaluate the effect of the first embodiment, a plurality of molded products (twelve pieces) are obtained by different molding conditions, such as changing the gradual cooling speed three times and the mold separation temperature four times. A refractive index of each product is measured in the above-mentioned manner and is illustrated in FIG. 4A.

According to the measurement, the following facts are obviously known. Namely, when the mold temperature is constant and the cooling time period is longer than 6 minutes, a difference in the refractive index is not produced as illustrated in FIG. 4B. Further, when comparing a case where the gradual cooling process is not performed to one in which it is performed, it is understood that the refractive index distribution is apparently decreased when the gradual cooling is performed as illustrated in FIG. 4A. It is also understood that the larger the gradual cooling band, or the lower the cooling speed, the more the refractive index distribution decreases.

For example, a refractive index distribution $\Delta n_{1/2}$ of a molded product, which is cooled at a speed of 1° C. per minute down to (Tg −40° C.), is $0.7×10^{−5}$. Thus, it is less than 1/20 of a molded product that had not received the gradual cooling.

With a conventional annealing process as discussed, for example, in Japanese Patent Application Laid Open No. 9-109165, the refractive index distribution $\Delta n_{1/2}$ can be decreased only up to approximately $3×10^{−5}$ at the very least. Thus, it is more effective to have the gradual cooling process performed under a temperature ranging from (Tg −40° C.) to (Tg 5° C.) than to execute the conventional annealing process. Even though the gradual cooling process is performed during the molding process and accordingly, the molding time period is increased, a lower cost and more highly accurate plastic optical element can be manufactured because, a second process, such as an annealing process, is not required (i.e., only one process is required).

According to common knowledge of injection molding, to obtain a highly precise molded product, it is believed that a gradual cooling treatment should preferably be applied down to a heat deformation temperature of approximately Tg −10° C., and that the gradual cooling is not required below the heat deformation temperature, in order to minimize a molding cycle.

However, the results obtained by the above-mentioned embodiment show that in order to decrease the refractive index distribution, it is preferable to decrease the mold separation temperature as far as possible (i.e., up to around Tg −40° C.) and gradually cool the mold.

Figure 5:
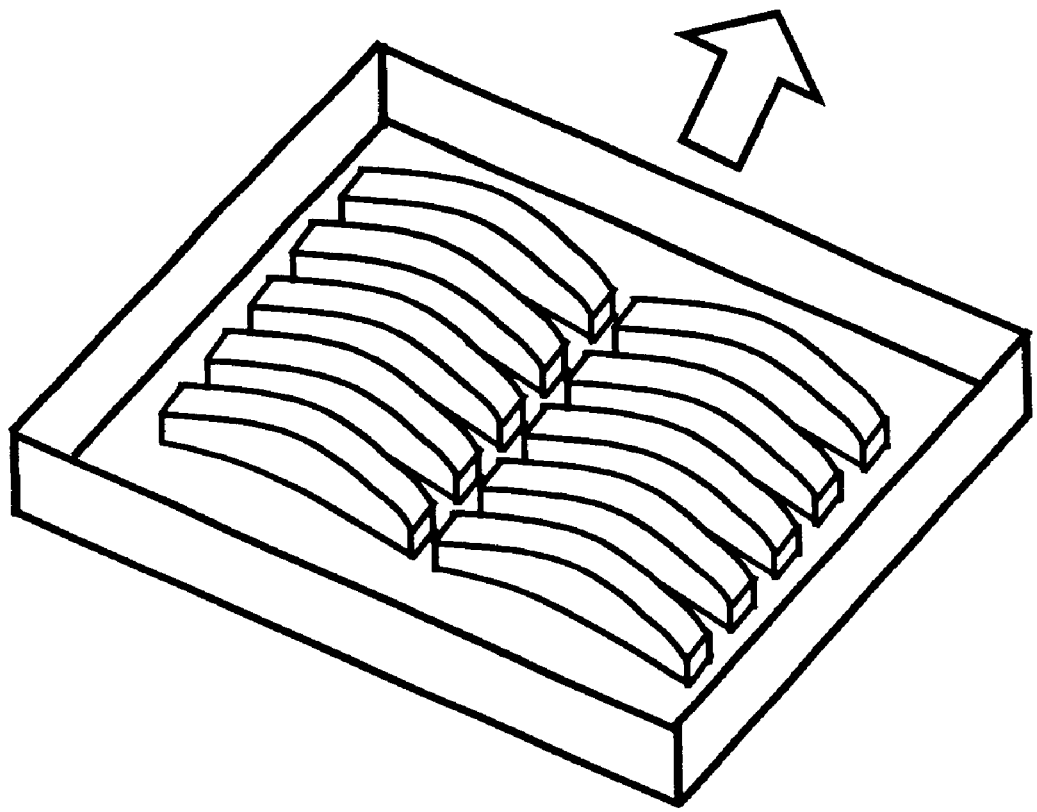
FIG. 5 is a perspective view illustrating molding items naturally left under a room temperature.

The second embodiment will now be described. A plastic optical element may be molded using an injection compression molding method similar to the first embodiment, and a molded product may be separated from the mold and left at room temperature for 24 hours, as illustrated in FIG. 5. Then, the molded product may be inserted into a temperature-controllable oven to be subjected to an annealing process, which includes a gradual cooling.

The above-described molding may be performed under the following conditions. A temperature Tg −10° C. may be set as the mold temperature at the time of injection molding and 6 minutes may be set as the time period for gradual cooling.

During the annealing process, the following processes may be performed. A temperature keeping process may be performed for a prescribed time period, for example, for one hour the temperature is kept at T1, wherein T1=Tg −15° C. After that, a gradual cooling may be performed at a speed of −X° C. per minute down to a taking out temperature of T2.

Figure 6:
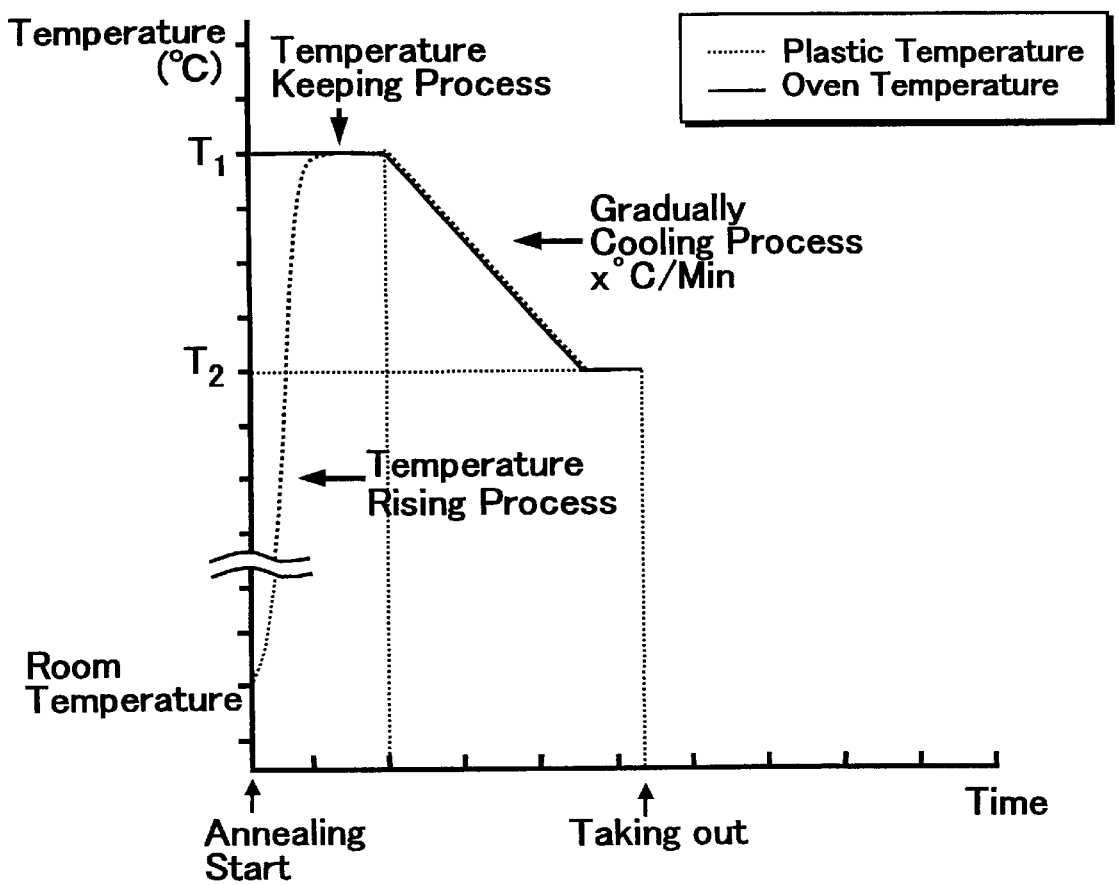
FIG. 6 is a characteristic-representing graph illustrating a gradual cooling process applied to the molding item.

Further, the temperature of the mold may be held at the taking out temperature T2 for 5 minutes, as illustrated in FIG. 6.

Thus, the molded product may have experienced (in the listed order): a rise in temperature from the room temperature up to a prescribed temperature range (i.e., approximately Tg); a temperature keeping process within the prescribed temperature range; and a cooling process.

To evaluate the effect of the second embodiment, a plurality of molded products are obtained under different conditions (i.e., a gradual cooling speed is changed three times and a taking out temperature is changed four times).

The refractive index distribution of each molded product is measured similarly to the above-mentioned manner, and is illustrated in FIG. 7A. Further, a sample product is molded after being subjected to an annealing process, wherein the molded product if kept at a prescribed constant temperature without being gradually cooled, as is illustrated in FIG. 7B.

The result of the second embodiment is now evaluated.

In the case where the annealing process is performed under a prescribed constant temperature without any gradual cooling, a refractive index distribution $\Delta n_{1/2}$ of the molded product is only approximately $3.8×10^{−5}$. On the other hand, in the case where the gradual cooling is performed, it is understood that the slower the gradual cooling speed and/or the greater the gradual cooling temperature band, the more the refractive index distribution $\Delta n_{1/2}$ decreases. A marked decrease in the refractive index distribution occurs when the gradual cooling speed is less than 3° C. per minute. Further, the refractive index distribution can be decreased even when the gradual cooling band is approximately 5° C. more than when using a conventional annealing process.

Further, when a mold is gradually cooled down to a temperature of Tg −40° C. at a speed of −1° C. per minute, a refractive index distribution $\Delta n_{1/2}$ can be widely decreased up to $0.6×10^{−5}$ even if the annealing time period is as short as 90 minutes.

Further, the refractive index distribution does not change when the temperature is kept constant for an elongated time period of more than 1 hour.

However, when the temperature is kept constant for a shorter period of time than 1 hour, the refractive index distribution slightly increases.

Thus, the amount of time a temperature is kept constant is important in controlling the refractive index distribution.

The above-described method has an advantage that the annealing time period takes only several tens of minutes and a conventional oven can process a large number of molded products so that plastic optical elements can be highly precisely manufactured at a low cost, even if it requires both molding and annealing processes.

The third embodiment of the present invention will now be described. A plastic optical element (i.e., a lens) may be molded using the injection compression molding method and then, separated from the mold. The plastic optical element may be immediately moved to an automated annealing apparatus and an annealing process, which includes the step of gradually cooling, may be performed therefor. The molding conditions of injection compression molding method are similar to those of the above-described second embodiment.

Figure 8:
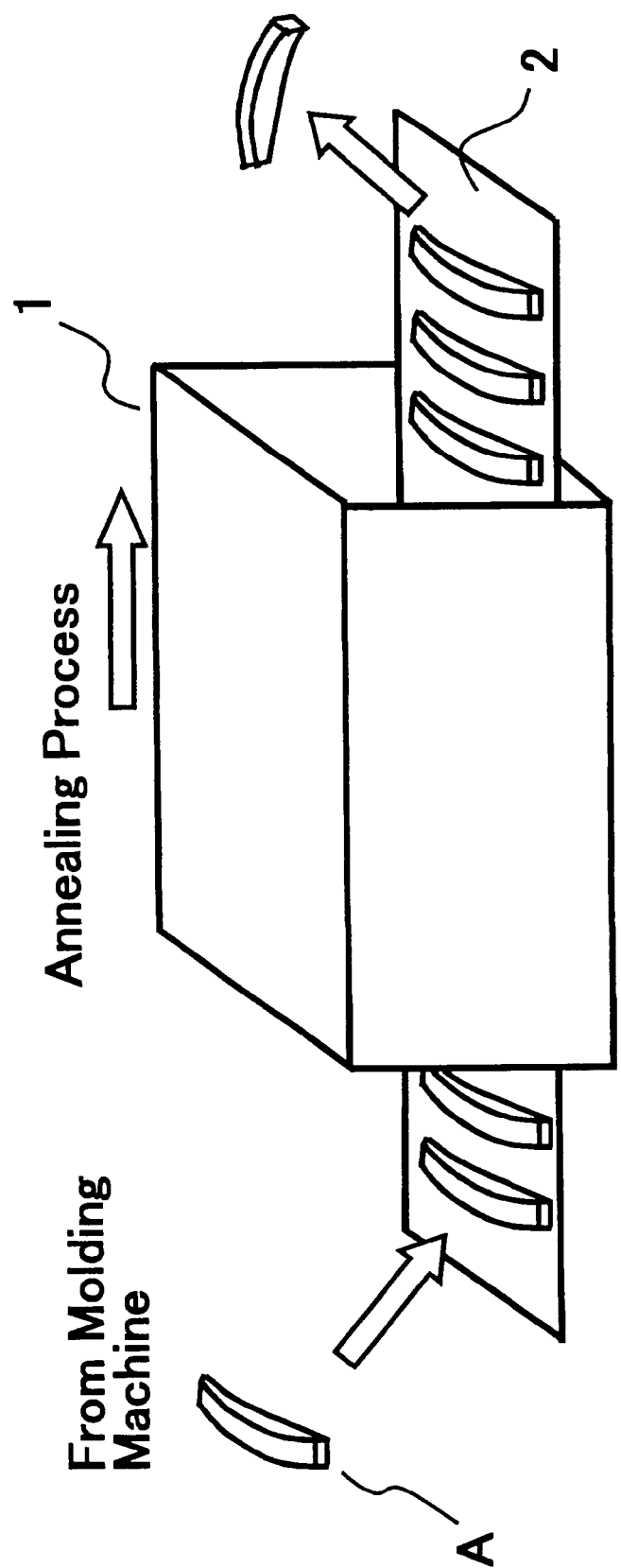
FIG. 8 is a schematic perspective view illustrating an annealing apparatus.
Figure 9:
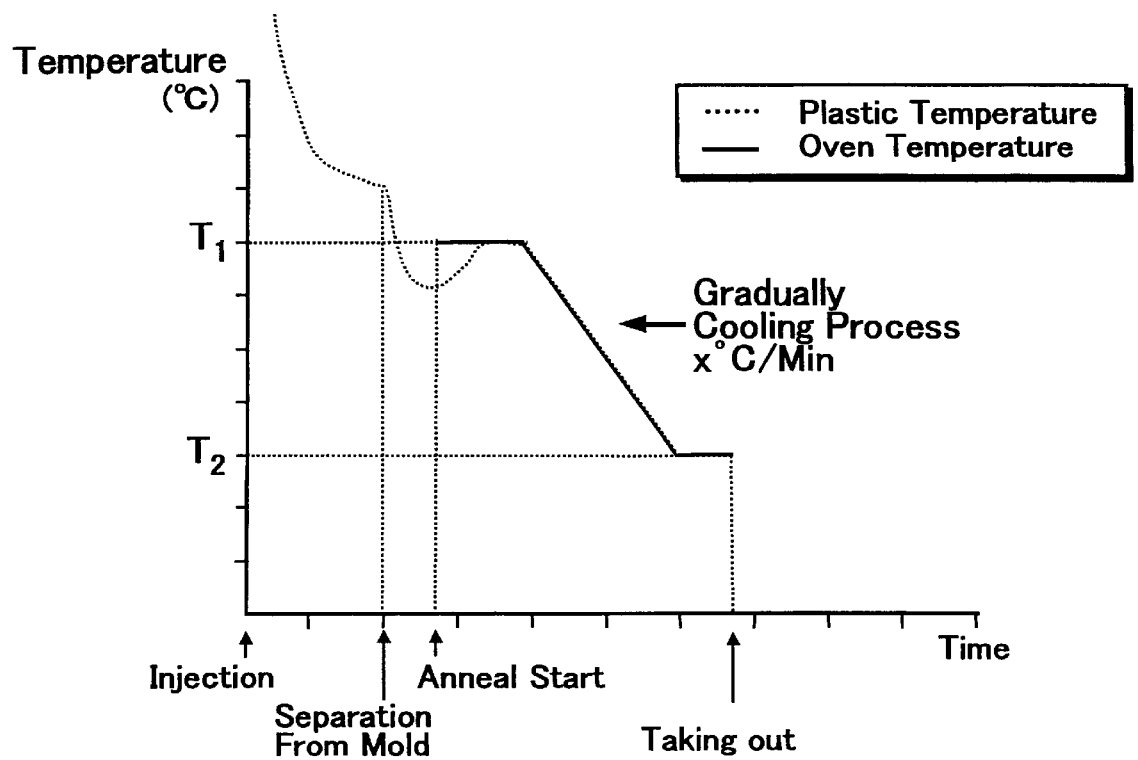
FIG. 9 is the second example of a temperature characteristic-representing graph showing an annealing process according to the present invention.
Figure 10:
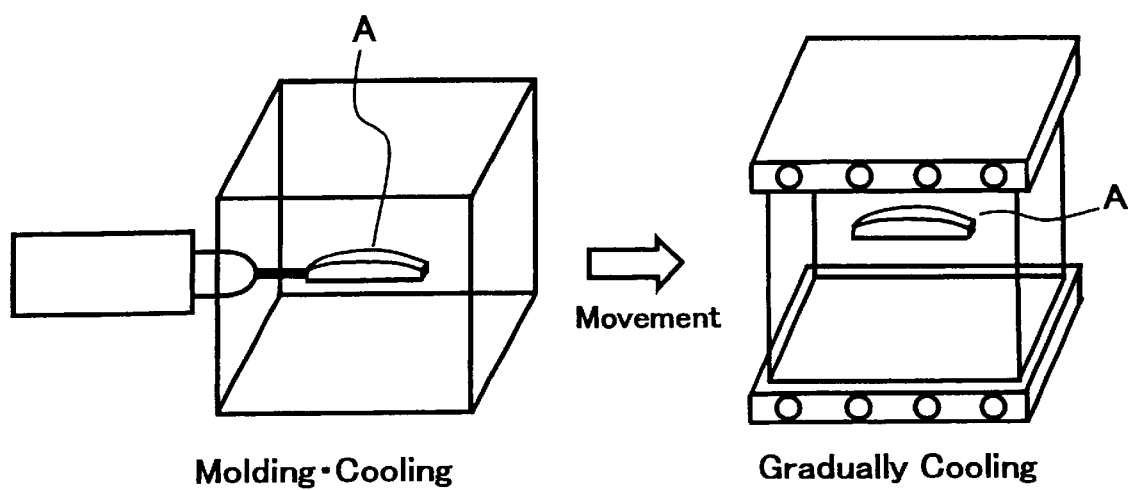
FIG. 10 is a schematic illustrating a molding/refrigerating process and a gradual cooling process performed in the annealing apparatus.

FIG. 8 is a perspective view illustrating an annealing apparatus 1. FIG. 9 is a graph illustrating the temperature characteristics of the second example of the annealing process. FIG. 10 is a mimetic chart illustrating a molding and cooling process for a molding product and the step of gradually cooling the molded product performed in the annealing apparatus. A temperature distribution inside the annealing apparatus 1 may be controlled in a prescribed manner. The annealing apparatus 1 may include an oven (not shown) and a belt conveyor 2. The annealing apparatus 1 may be configured to execute an annealing process, which includes gradually cooling a plastic optical element A by driving the belt conveyor 2. A temperature of the oven may be controlled to gradually decrease at a prescribed speed along with the conveyance of the molded product A on the belt conveyor 2 through the annealing apparatus 2.

In the annealing process, the following steps may be performed. As illustrated in FIG. 9, a step of keeping a temperature constant at the temperature T1, for example, Tg −15° C. for a prescribed time period, such as 10 minutes, may be performed. After that, the plastic optical element A is gradually cooled in the oven (not shown) at a speed of X° C. per minute down to a taking out temperature of T2.

Further, the optical element A may be held in the oven for approximately five minutes at the taking out temperature of T2 in a state as illustrated in FIG. 5.

To evaluate the effect of the third embodiment, a plurality of molded products are obtained by executing a annealing process, wherein the gradual cooling speed is changed three times and the corresponding taking out temperature is changed three times, so that nine different molded products are obtained due to the different combinations of cooling speed and take-out temperature used.

Based on the evaluation, an effect similar to that illustrated in FIG. 7A can be obtained with the third embodiment.

Namely, it is understood that the refractive index distribution $\Delta n_{1/2}$ is widely decreased when compared with the case where the conventional annealing process is utilized.

Further, it is also found that the refractive index distribution $\Delta n_{1/2}$ does not change when the temperature is kept constant for an elongated time period of more than ten minutes.

However, when the time period of keeping the temperature constant is shortened to less than 10 minutes, the refractive index distribution $\Delta n_{1/2}$ is slightly increased, and it markedly increases when the time period the temperature is kept constant is shorter than three minutes. The reason why a result similar to the second embodiment is obtained, even though the period of time the temperature is kept constant is widely minimized when compared with the second embodiment, is hypothesized, as follows:

Because a molded product already has a high temperature (i.e., close to Tg) before starting the annealing process, the a predetermined time period, during which it is required for the molded product of the second embodiment to rise in temperature and then level off in temperature, can be shortened.

According to the third embodiment, labor cost can be minimized by automating the processes starting from the injection molding process up to the annealing process. Since the annealing time period is shortened, production costs are minimized so that a highly precise plastic optical element can be manufactured at low cost.

The fourth embodiment will now be described. A plastic optical element may be molded using a gate seal injection molding method as described in Japanese Patent Registration No. 2550086. When plastic is filled in a cavity and a prescribed time period has elapsed, a molding unit may be extracted from a molding machine and moved. After that, the molding unit may be gradually cooled down to a temperature lower than a temperature of Tg −20° C. The gradual cooling step may be performed in such a manner that a temperature control plate, adjacent to upper and lower temperature controllable heaters, seizes the molding unit to control its temperature.

The effect of the fourth embodiment is as follows. Similarly to the first embodiment, the slower the gradual cooling speed is less than Tg or the lower the mold separating temperature is, the more the refractive index distribution $\Delta n_{1/2}$ decreases. Values of the refractive index distribution $\Delta n_{1/2}$ are also similar to that of the first embodiment. As described with respect to the first embodiment, a molded product has heretofore been taken out when using a conventional gate seal molding method at approximately a heat deformation temperature (i.e., Tg −10° C.) according to common sense injection molding knowledge that it is not required to gradual cool a mold below the heat deformation temperature to shorten the cycle.

However, in the fourth embodiment the following facts are found. Namely, it is preferable for decreasing the refractive index distribution $\Delta n_{1/2}$ to gradually cool the mold down to around Tg −40° C., and a mold separation temperature is low as possible.

Any other suitable gradual cooling method can be utilized for the above-mentioned gradual cooling process performed by seizing the mold with the temperature control plate. For example, a molding unit can be air cooled with while being supported on a plurality of fulcrums at a plurality of corresponding contact points. Otherwise, an entire molding unit can be moved along conveyors through an automatically controllable oven temperature apparatus to obtain the result similar to that of the third embodiment.

As illustrated in FIG. 7B, the refractive index distribution $\Delta n_{1/2}$ becomes at least only approximately $3.0 \times 10^{-5}$, when using a conventional annealing process performed at a constant temperature or when using a conventional molding process performed at either a constant temperature or gradual cooling the mold down to only the heat deformation temperature level.

However, according to the present invention, use of the above-mentioned gradual cooling process can widely decrease the refractive index distribution $\Delta n_{1/2}$ below $2.1 \times 10^{-5}$. Further, any kind of a device can be employed in order to execute the above-mentioned gradual cooling process, not just the methods and apparatuses described with respect to the first through the fourth embodiments. Further, any kind of molding method and molding condition can be employed in order to obtain the prescribed precision of shape and low double refraction characteristic, not just the above-described injection molding as a molding process. Further, if the gradual cooling process of the present invention is at least included in a final cooling process, any kind of temperature-keeping process can be experienced before the gradual cooling process so that the refractive index distribution $\Delta n_{1/2}$ can be decreased.

Numerous additional modifications and variations of the present invention are possible in light of the above teachings. It is therefore to be understood that within the scope of the appended claims, the present invention may be practiced otherwise than as specifically described herein.

What is claimed as new and desired to be secured by letters patent of the United States is:

1. A method of manufacturing an optical element from a plastic material, the method comprising the steps of:

molding the plastic material in a mold to form the optical element, wherein the molding is performed at a prescribed molding temperature higher than a glass transition point of the plastic material used to form the optical element; and gradually cooling the optical element by 3° C. per minute from a temperature lower than the glass transition point by 10° C. to a temperature lower than the glass transition point by 40° C. to reduce a refractive index distribution of the optical element.

2. The method as claimed in claim 1, further comprising the step of:

keeping a temperature of the optical element within a prescribed range of temperatures for more than 3 minutes, before the step of gradually cooling the optical element is performed.

3. The method as claimed in claim 2, further comprising the step of:

naturally cooling the optical element down to a temperature below a mold separation temperature; and heating the optical element up to a prescribed temperature, before the step of gradually cooling the optical element is performed.

4. The method as claimed in claim 3, further comprising the step of:

separating the optical element from a mold used to form the optical element.

5. The method as claimed in claim 4, wherein the step of gradually cooling the optical element is performed after the step of separating the optical element from the mold.

6. The method as claimed in claim 4, wherein the step of gradually cooling the optical element is performed before the step of separating the optical element from the mold.

7. The method as claimed in claim 6, wherein the step of gradually cooling the optical element is performed by any one of air-cooling the mold and subjecting the mold to a temperature control performed by a temperature controllable apparatus after separating the mold from a molding machine.

8. The method as claimed in claim 6, wherein the step of gradually cooling the optical element is performed in the mold by both providing and controlling any one of a heater, a cooling element, and a temperature control tube.

9. The method as claimed in claim 1, wherein the step of gradually cooling the optical element is performed by inserting the optical element into a temperature controllable apparatus and controlling a temperature of the temperature controllable apparatus.

10. The method as claimed in claim 1, wherein the step of gradually cooling the optical element is performed by conveying a mold, having a cavity therein which is filled with any one of the plastic forming the optical element and the optical element, on a conveyor belt through a temperature controllable apparatus in which a temperature varies along a length of the conveyor belt.

* * * * *